US012665761B2

(12) United States Patent
Roy et al.

(10) Patent No.: US 12,665,761 B2
(45) Date of Patent: Jun. 23, 2026

(54) MUTUAL AUTHENTICATION BETWEEN A HARDWARE TOKEN AND NON-NETWORKED DEVICE

(71) Applicant: MOZARC MEDICAL US LLC, Minneapolis, MN (US)

(72) Inventors: Arindam Ghosh Roy, Bangalore (IN); Sharath Nagendra, Bangalore (IN)

(73) Assignee: MOZARC MEDICAL US LLC, Minneapolis, MN (US)

( * ) Notice: Subject to any disclaimer, the term of this patent is extended or adjusted under 35 U.S.C. 154(b) by 165 days.

(21) Appl. No.: 17/360,745

(22) Filed: Jun. 28, 2021

(65) Prior Publication Data

US 2022/0417022 A1 Dec. 29, 2022

(51) Int. Cl.
*H04L 9/32* (2006.01)
*H04L 9/08* (2006.01)

(52) U.S. Cl.
CPC ............ *H04L 9/3213* (2013.01); *H04L 9/085* (2013.01); *H04L 9/0866* (2013.01); *H04L 9/0872* (2013.01); *H04L 9/3226* (2013.01)

(58) Field of Classification Search
None
See application file for complete search history.

(56) References Cited

U.S. PATENT DOCUMENTS

| | | | | | |
|---|---|---|---|---|---|
| 8,681,987 | B2 * | 3/2014 | Fairbanks | ........... | H04L 63/0869 |
| | | | | | 713/169 |
| 9,767,333 | B1 * | 9/2017 | Diorio | ................... | H04L 9/3273 |
| 9,980,140 | B1 * | 5/2018 | Spencer | ................ | H04W 12/02 |
| 10,664,670 | B1 * | 5/2020 | Diorio | ................ | G06K 7/10297 |
| 12,008,098 | B1 * | 6/2024 | Creek | ................... | G06F 21/445 |
| 12,126,995 | B2 * | 10/2024 | Hua | ........................ | H04L 9/0618 |
| 2006/0012473 | A1 * | 1/2006 | Bishop | ................... | G06Q 20/20 |
| | | | | | 340/539.1 |
| 2010/0308978 | A1 * | 12/2010 | Brown | .................. | H04L 9/3213 |
| | | | | | 340/10.42 |
| 2011/0209212 | A1 * | 8/2011 | Newlin | ............... | A61M 1/3693 |
| | | | | | 726/17 |
| 2011/0258452 | A1 * | 10/2011 | Coulier | ................. | H04L 9/3242 |
| | | | | | 713/171 |
| 2013/0232082 | A1 * | 9/2013 | Krawczewicz | ........ | G16H 10/60 |
| | | | | | 705/55 |

(Continued)

FOREIGN PATENT DOCUMENTS

| | | | | |
|---|---|---|---|---|
| EP | 0640945 | 3/1995 | | |
| EP | 3327679 | A1 * 5/2018 | ......... | G07C 9/00309 |
| WO | 2010057423 | 5/2010 | | |

OTHER PUBLICATIONS

European Search Report for App. No. 20194964.1, dated Dec. 8, 2020.

(Continued)

*Primary Examiner* — Rupal Dharia
*Assistant Examiner* — Shadi H Kobrosli
(74) *Attorney, Agent, or Firm* — Greenberg Traurig, LLP

(57) ABSTRACT

Systems and methods for performing mutual authentication between a hardware access token and a reader device are provided. The systems and methods include reading a unique or pseudo-unique identifier of the hardware access token and computing a password for the hardware access token based on the unique or pseudo-unique identifier and a group secret of the reader device.

24 Claims, 5 Drawing Sheets

(56) References Cited

U.S. PATENT DOCUMENTS

| | | | |
|---|---|---|---|
| 2014/0266591 A1* | 9/2014 | Klammer | G06F 21/44 |
| | | | 340/5.65 |
| 2016/0034728 A1* | 2/2016 | Oliver | H04L 9/0833 |
| | | | 340/10.1 |
| 2018/0255189 A1* | 9/2018 | Granby | H04N 1/00079 |
| 2018/0359250 A1* | 12/2018 | Lerner | G06F 21/36 |
| 2019/0036688 A1* | 1/2019 | Wasily | H04L 9/3231 |
| 2020/0187005 A1* | 6/2020 | Gabriel | G06F 16/2255 |
| 2021/0074396 A1* | 3/2021 | Parari | G06F 21/445 |
| 2021/0084700 A1* | 3/2021 | Daniels | H04L 9/3226 |
| 2024/0062597 A1* | 2/2024 | Fujii | G06Q 10/00 |

OTHER PUBLICATIONS

Li Xiong, et al, "An Enhancement of a Smart Card Authentication Scheme for Multi-server Architecture", Wireless Personal Communications, Springer, Dordrecht, NL, vol. 80, No. 1, Aug. 19, 2014, pp. 175-192.

* cited by examiner

MUTUAL AUTHENTICATION BETWEEN A HARDWARE TOKEN AND NON-NETWORKED DEVICE

FIELD

Systems, methods, and devices are provided for mutual authentication between a hardware token and non-networked device. The systems, methods, and devices can be used in a non-networked architecture that can or cannot have centralized control.

BACKGROUND

User authentication, programmatic access to a device, and data are often controlled to operate systems, devices, components, and methods. Such control is used to access data centers, cloud processing, autonomous vehicles, wearable computers, internet of things (IoT) devices, mobile computing, and by way of nonlimiting example, biomedical devices. However, in a decentralized framework where each device or component is not connected to each other, any updates to user credentials must be shared across each device or component. Otherwise, an unauthorized user can simply attempt to access each component. Failure to access a device only leads to another attempt at unauthorized access on a different device or component and so on, until a vulnerable device is accessed. In the known non-networked systems and methods, each device, component, and computer are updated individually across all devices, components, and computers if any change is made. The updates can be made periodically or instantly upon any change. However, the update and management process can be tedious and difficult to implement because each machine, node, or device must store and update data from each other device, as well as be updated regularly with new data. Each device and component should also have sufficient processing capacity and undergo regular hardware updates that must be propagated to all machines.

The known processes and systems cannot uniformly and quickly implement such updates in a decentralized and/or non-networked architecture. Managing user access becomes difficult as the number of machines, nodes, or devices increase. A situation can arise where non-networked machines lacking central control cannot be used together in a particular setting because of the sheer number and frequency of updates and changes to access credentials. Although RFID cards can store authentication information specific to each user, devices in a non-networked architecture need to store the authentication information of all the valid RFID cards locally. In a setting having multiple units or devices, the addition of a new RFID card would mean that all the medical devices need to be updated with the authentication information of each new RFID card. Without this, the new RFID card will not be usable on all the medical devices. In the absence of a network architecture and/or central control, a tedious and time-consuming manual update of all devices is required.

As such, there is a need for systems and methods that can be used in a non-networked environment. There is also a need for an authentication and verification system and related methods having plural devices that is not controlled by a central control center or server. There is a need for a security architecture that does not require centralized management of user credentials. There is still further a need for a security framework in which the components do not rely on a network connection that relies on each device storing all the required user credentials of every other device. There is a need for systems and methods where all machines and devices in a particular setting can be used by any authorized user. There is a need for systems and methods where a new user can be added without requiring all other devices to be updated with the authentication information of the new user. There is a need where devices can be securely used in a location or specific geographic area that may not have a stable internet connection or that can experience frequent connection loss. There is a need for authorizing access for machines having intermittent or poor internet access. The background information is provided to merely assist in understanding non-limiting, illustrative problems presented. Unless stated explicitly, or clearly in context, the information contained in the background is not intended in this section or throughout this disclosure to be an admission of known or prior art or to limit any aspect.

SUMMARY OF THE INVENTION

The problem to be solved is to provide uniform access control for non-networked devices in a decentralized setting. The solution is to perform mutual authentication between a hardware access token and a reader device wherein a unique or pseudo-unique identifier is present on the access token.

The first aspect relates to a method. In any embodiment, the method can include performing mutual authentication between a hardware access token and a reader device, including: computing a password from a unique or pseudo-unique identifier stored on the hardware access token and a group secret stored on the reader device wherein the unique or pseudo-unique identifier can be read from the hardware access token when the hardware access token can be in operational contact with the reader device; granting the reader device access to an onboard data structure of the hardware access token upon verification of the password, wherein the onboard data structure contains authentication data; and granting the hardware access token access to the reader device upon verification of the authentication data read from the hardware access token.

In any embodiment, the reader device can be a non-networked device.

In any embodiment, the reader device can be a biomedical device.

In any embodiment, the hardware access token can be a radio frequency identification (RFID) card.

In any embodiment, the hardware access token can be a universal serial bus (USB) drive.

In any embodiment, the method can include determining that a second hardware access token has not been provisioned for use with the reader device, generating an onboard data structure, including authentication data, for the second hardware access token, and storing the generated onboard data structure on the second hardware access token.

In any embodiment, the group secret can be a shared key between a group including a plurality of similar reader devices.

In any embodiment, the group can include a subset of similar reader devices being less than all reader devices of a particular model supplied by a common manufacturer.

In any embodiment, the group can include a set of devices operated by a common enterprise, and the group secret can be unique to the enterprise.

In any embodiment, the enterprise can be a medical clinic or hospital.

In any embodiment, the method can include provisioning the group secret to a device newly added to the group.

In any embodiment, the method can include removing the group secret from a device to be removed from the group.

In any embodiment, the method can include recognizing a master control token for the group, and entering an administrative mode.

In any embodiment, the onboard data structure can include an expiry for the hardware access token.

In any embodiment, the method can include causing the reader device to enter an operational mode after performing mutual authentication.

In any embodiment, the operational mode can be a therapeutic mode.

In any embodiment, the operational mode can be a therapy setting mode.

In any embodiment, the hardware access token can be a healthcare provider card.

In any embodiment, the hardware access token can be a patient card.

The features disclosed as being part of the first aspect can be in the first aspect, either alone or in combination, or follow any arrangement or permutation of any one or more of the described elements. Similarly, any features disclosed as being part of the first aspect can be in a second or third aspect described below, either alone or in combination, or follow any arrangement or permutation of any one or more of the described elements.

The second aspect relates to a multimode device. In any embodiment, the multimode device can provide a plurality of modes, including one or more access-controlled modes, including: a hardware platform including a processor and a memory; a token reader including an interface to communicate with one or more hardware access tokens; and instructions encoded within the memory to instruct the processor to: detect an insertion or proximity of a hardware access token; get an identification key from the hardware access token; compute, from the identification key and from a group key stored on the multimode device, a password for the hardware access token; use the password to unlock an authentication data structure stored on the hardware access token; authenticate the hardware access token using the identification key; and responsive to authenticating, unlock an access-controlled mode of the multimode device.

In any embodiment, the device can be a non-networked device.

In any embodiment, the device can be a biomedical device.

In any embodiment, the one or more hardware access tokens can include radio frequency identification (RFID) cards.

In any embodiment, the one or more hardware access tokens can include universal serial bus (USB) drives.

In any embodiment, the group key can be a shared key between a group including a plurality of similar devices.

In any embodiment, the group can include a subset of similar devices being less than all devices of a particular model supplied by a common manufacturer.

In any embodiment, the group can include a set of devices operated by a common enterprise, and the group secret can be unique to the enterprise.

In any embodiment, the enterprise can be a medical clinic or hospital.

In any embodiment, the multimode device can provide provisioning of the group secret to a device newly added to the group.

In any embodiment, the multimode device can remove the group secret from a device to be removed from the group.

In any embodiment, the multimode device can recognize a master control token for the group and enter an administrative mode.

In any embodiment, the authentication data structure can include an expiry for the hardware access token.

In any embodiment, the device can enter an operational mode after performing mutual authentication.

In any embodiment, the operational mode can be a therapeutic mode.

In any embodiment, the operational mode can be a therapy setting mode.

In any embodiment, the one or more hardware access tokens can include healthcare provider cards.

In any embodiment, the one or more hardware access tokens can include patient cards.

The features disclosed as being part of the second aspect can be in the second aspect, either alone or in combination, or follow any arrangement or permutation of any one or more of the described elements. Similarly, any features disclosed as being part of the second aspect can be in the first or third aspect described below, either alone or in combination, or follow any arrangement or permutation of any one or more of the described elements.

The third aspect relates to a system for providing controlled access to a group of devices. In any embodiment the system can include: a plurality of devices; and a plurality of access control cards; wherein the access control cards include individual unique identifiers, and authentication data, wherein the authentication data are accessible via a unique password per access control card; and wherein the plurality of devices include programming to get, from an inserted access control card, a unique identifier, compute the unique password for the inserted access control card according to a group key shared between the plurality of devices, use the unique password to unlock the authentication data, and upon verifying the authentication data, unlock a mode of the devices.

In any embodiment, the plurality of devices can be non-networked devices.

In any embodiment, the plurality of devices can be biomedical devices.

In any embodiment, the access control cards can be radio frequency identification (RFID) cards.

In any embodiment, the access control cards can be universal serial bus (USB) drives.

In any embodiment, the plurality of devices can include a subset of similar devices being less than all devices of a particular model supplied by a common manufacturer.

In any embodiment, the plurality of devices can include a set of devices operated by a common enterprise, and the group key can be unique to the enterprise.

In any embodiment, the enterprise can be a medical clinic or hospital.

In any embodiment, the devices can include programming to provision the group key to a device newly added to the plurality of devices.

In any embodiment, the devices can include programming to remove the group key from a device to be removed from the plurality of devices.

In any embodiment, the devices can include programming to recognize a master control token for the group, and to enter an administrative mode.

In any embodiment, the authentication data can include an expiry for the access control cards.

In any embodiment, the system can enter an operational mode after performing mutual authentication.

In any embodiment, the operational mode can be a therapeutic mode.

In any embodiment, the operational mode can be a therapy setting mode.

In any embodiment, the access control cards can be healthcare provider cards.

In any embodiment, the access control cards can be patient cards.

The features disclosed as being part of the third aspect can be in the third aspect, either alone or in combination, or follow any arrangement or permutation of any one or more of the described elements. Similarly, any features disclosed as being part of the third aspect can be in the first or second aspect, either alone or in combination, or follow any arrangement or permutation of any one or more of the described elements.

DETAILED DESCRIPTION

Figure 1:
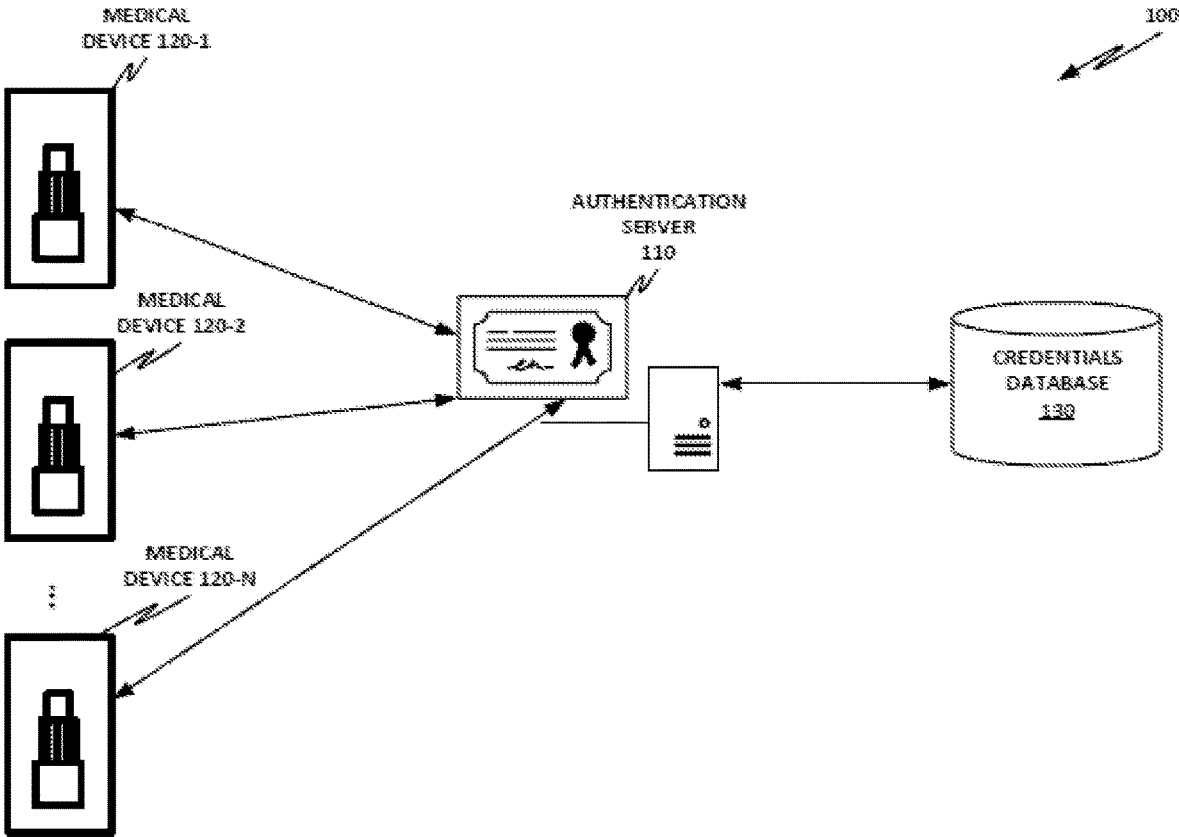
FIG. 1 is a block diagram of a device ecosystem.

Unless defined otherwise, all technical and scientific terms used have the same meaning as commonly understood by one of ordinary skill in the art.

The articles "a" and "an" are used to refer to one to over one (i.e., to at least one) of the grammatical object of the article. For example, "an element" means one element or over one element.

The term "access" refers to gaining permission to, including permission to operate on, change, modify, or otherwise reconfigure a device, data structure, or similar.

The term "access control card" refers to a hardware token or device that can be used to authenticate a holder of the access control card for access.

The term "access-controlled mode" refers to a mode wherein access to the mode can be granted only upon authentication.

The term "access token" refers to a hardware or software token that can be used to authenticate to a device for the purpose of gaining access.

The term "administrative mode" refers to a mode of operation in which an operator can perform administrative functions, including functions that are barred to ordinary users. This can include device configuration, provisioning of keys, provisioning of modes, or similar.

The term "authenticate" refers to satisfactorily proving to a device, a system, or a module, to the satisfaction of that device, system, or module, that a person or device is that person or device purports to be.

The term "authentication data" refers to data that may be used to authenticate a person, device, or module. Authentication data may include, for example, a username and password combination, a shared secret, data from which a password can be computed, a valid certificate, a valid token, or similar.

The term "biomedical device" refers to a device that provides therapy, monitoring, or telemetry for a biological entity, and most particularly, for a human. Biomedical devices may passively monitor a human patient, or they may actively administer a therapeutic service.

The term "communicate" refers to any exchange of information or data between two persons and/or devices.

The term "controlled access" refers to access that is limited or denied, except when access control conditions are satisfactorily met.

The term "enterprise" refers to any group of entities that operate with a common structure, a common goal, or common equipment and facilities. An enterprise may include, for example, a business, a business conglomerate, an industry association, a trade group, a government, a government agency, a nonprofit organization, a church or religious institution, a family, or a personal computing network.

The term "expiry" refers to a time at which an object becomes invalid, or is no longer usable.

The term "group secret" refers to a secret (such as a certificate, cryptographic key, or other shared datum) that is held by each member of a group.

The term "hardware platform" refers to an electronic device that may include a mix of analog, digital, and mixed-signal circuits to carry out an algorithm.

The term "healthcare provider card" refers to a hardware token issued to a healthcare provider, such as a doctor, a nurse, an orderly, a certified nursing assistant (CNA), a licensed vocational nurse (LVN), technician, orderly, or other healthcare professional.

The term "identification key" refers to a key, such as a certificate, password, hash, or other data that may be used to identify a person or an entity.

The term "identifier" refers to data that may be tied to a particular device, entity, or person. In some cases, the identifier could be a large integer or a hash.

The term "instructions" refers to data that may be used to program an electronic circuit to provide a desired algorithm. Instructions can include operation codes (opcodes) and/or microcode used to program a microprocessor or microcontroller to carry out an algorithm. Instructions could also include hardware description language (HDL) instructions that are used to configure a field-programmable gate array (FPGA) or application-specific integrated circuit (ASIC) to carry out a desired algorithm.

The term "interface" refers to any combination of hardware, software, and/or firmware that enables one object to communicatively couple to another object.

The term "master control token" refers to a hardware and/or software token that is used to authenticate a person or device to gain access to a target device with access to functions that are restricted to a majority of users.

The term "medical clinic" refers to an enterprise that provides medical services.

The term "mode" refers to an operational construct, in which hardware or software may operate with different capabilities, permissions, or functions, depending on the configuration of the mode. Each mode may have designated conditions or prerequisites, and may be designed to enable certain functions to be carried out in the mode.

The term "model" refers to a data structure and/or algorithm that represents, or that can be used to predict the behavior of, a real-world object.

The term "multimode device" refers to a device that provides more than one mode of operation.

The term "mutual authentication" refers to an operation in which a first device and a second device both authenticate the other, either simultaneously, or sequentially. Mutual authentication fails unless both devices successfully authenticate to the other devices. Mutual authentication could also include more than two devices, such as three or more devices.

The term "non-networked device" refers to a device that lacks a reliable or consistent network connection.

The term "onboard data structure" refers to any data structure that is stored on a device, such as within a memory of the device.

The term "operational contact" refers to a condition in which a first device and a second device are placed, wherein the first device and second device are able to interoperate. Operational contact could include, in the case of a hardware interface, inserting the first device into the second device, or in the case of a wireless device, placing the devices in near proximity such that they can communicate, or otherwise triggering communication.

The term "password" refers to a secret that is a "something you know" factor in a single-factor or multi-factor authentication. A password could be a secret that is memorized by a human user, or that is encoded within a memory structure of a device, either directly, or via a hash.

The term "patient card" refers to a hardware token or other access token that is used to identify or authenticate a patient receiving therapeutic services. In some cases, the patient card may carry personal identifiable information (PII) or protected health information (PHI) about the patient.

The term "programming" refers to instructions to configure a programmable circuit.

The term "provision" refers to allocation to an entity. For example, when a secret or other data are provisioned to a device, those data are stored in a location on the device where they are usable for their intended purpose.

The term "proximity" refers to objects being physically near to one another. In the particular case of wireless communication, proximity includes a condition where two devices are physically near enough to each other that they are able to perform a communication.

The term "pseudo-unique" refers to data that are not guaranteed to be unique (e.g., as when issued by a central authority that ensures unique data are not issued to two different entities), but sufficiently statistically likely to be unique for the purposes of an operation. For example, a pseudo-unique identifier may be allocated to a device without checking with a central authority to ensure that the pseudo-unique identifier has not already been taken by another device. If the number of possible pseudo-unique identifiers in the computational space is large enough, then even if two devices independently randomly or pseudo-randomly generate an identifier, the probability that the two identifiers will be the same is low enough to provide confidence in the method, such as an authentication method.

The term "read" refers to retrieval of data from a memory or a storage location.

The term "reader device" refers an apparatus that includes the appropriate hardware, software, firmware, or any combination thereof to communicate with another hardware device, and to retrieve data therefrom. For example, a reader device could include an apparatus with a universal serial bus (USB) interface that can read from a USB drive, an RFID transceiver that can read from an RFID card, or some other similar structure.

The term "RFID card" refers to a portable device with a radio frequency identification (RFID) transceiver. This could be an embedded RFID chip, an identification card, a credit card, or similar that can do that.

The term "shared key" refers to a cryptographic key that is distributed to a plurality of devices or actors, so that the devices or actors can cryptographically verify the same data.

The term "therapeutic mode" refers to a mode of operation of a medical device in which the device administers an intended therapy to a patient.

The term "token reader" refers to an apparatus that can read hardware and/or software keys from a hardware token.

The term "unique" refers to the property of being guaranteed to be different from any other, within the context of an operational sphere. For example, a central authority may issue unique identifiers, and when a request is received for a new unique identifier, the central authority may randomly or pseudo-randomly generate an identifier, and then check the new identifier against a database of previously-issued identifiers. If the identifier has already been used, then a new random or pseudorandom identifier may be generated. This guarantees that no two devices receive the same identifier.

The term "USB (universal serial bus)" refers to an industry standard that specifies cables, connectors, and protocols for communicating serially.

The term "verify" refers to determining, with sufficient confidence for the operational purpose, that a person, device, or object is genuine or authentic.

Device Ecosystem

FIG. 1 is a block diagram of a device ecosystem 100. Device ecosystem 100 includes an authentication server 110 that communicates with a credentials database 130. In any embodiment, the device ecosystem 100 can also be used in other fields of art, including general computing, cryptography, data centers, cloud processing, autonomous vehicles, wearable computers, internet of things (IoT) devices, and mobile computing, by way of non-limiting example. In one non-limiting embodiment, the device ecosystem 100 can be used for medical devices, such as dialysis machines and other similar devices for home or clinical use. The medical devices can have a plurality of modes of operation that need to be protected against unauthorized access. The plurality of modes can include not only configuration modes, but also operational modes for administering therapy. For example, there can be protected health information (PHI) and personal identifiable information (PII) stored in a dialysis machine, which is viewable through a graphical user interface (GUI), located on a front panel of the machine. For confidentiality purposes, the PHI should be protected, and only viewable by the patient or an attending medical professional. The health insurance portability and accountability act (HIPAA) security rules enacted in 1997 in the United States control access to such information. Similar laws throughout the world also establish standards to protect a patient's electronic PHI. Thus, access to a GUI screen that displays PHI and PII can be controlled by the device ecosystem 100.

In any embodiment, the authentication server 110 can communicate via a network connection with any components or devices used in general computing, cryptography, data centers, cloud processing, autonomous vehicles, wearable computers, internet of things (IoT) devices, and mobile computing. In one non-limiting example of a medical device, the authentication server 110 can communicate with medical device 120-1, medical device 120-2, through nth-medical device 120-N. Using the device ecosystem 100, user authentication and device functionality can be controlled. Specifically, the device ecosystem 100 can authenticate a clinician before starting therapy on a system. The user can be authenticated and provided authorized access to the functionalities of the medical device, per the role of the user. For example, a clinician user of a dialysis machine can have access to lesser functionality than an administrator of the clinic. Based on the authorization, the access can be controlled. For example, an administrator or other privileged user should have access to the critical functionalities, like exporting PHI, modifying safety-critical device settings, and similar using the device ecosystem 100. Regulatory authorities can also mandate that user authentication and access control be based on a user authorization for a medical device, such as a dialysis machine using the device ecosystem 100.

In any embodiment, the device ecosystem 100 can maintain access controls to all devices connected to a network. For example, if the devices all have a consistent, always-on network connection, then credentials can be centrally managed by a credential server. As new users are added to the system, old users are removed, or access for particular users is updated, these changes can be pushed out from the central credentialing server, and propagated out to the network-connected devices in real-time, or near real-time using the device ecosystem 100. So long as persistent network communication is maintained between medical devices 120 and authentication server 110 on the one hand, and authentication server 110 and credentials database 130 on the other hand, authentication server 110 can provide persistent updates to medical devices 120, and to monitor and maintain access authorization. In that case, authorized users can log into medical devices 120 with a key card such as an RFID card, or via a username and password combination, and can then access authorized functions on the devices. However, if medical devices 120 are removed from network communication with authentication server 110, then centralized updates can no longer be provided. In that case, there may be a need to manually update each medical device 120 every time there is a change to the ecosystem, such as intake of a new patient, intake of a new employee, intake of a new administrator, or removal of a patient, employee, or administrator.

Device Ecosystem Including RFID Access Card

Figure 2:
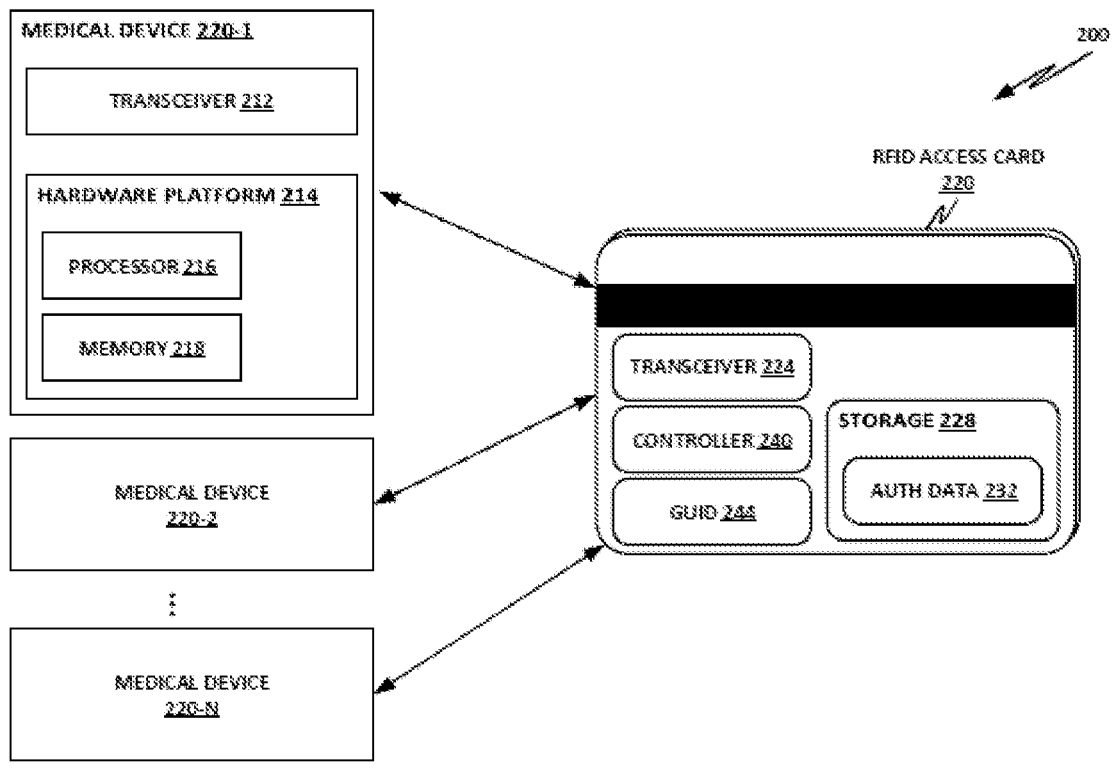
FIG. 2 is a block diagram illustrating additional aspects of a device ecosystem.

FIG. 2 is a block diagram of a device ecosystem 200. Device ecosystem 200 includes an RFID access card 210, which is communicatively coupled, in one non-limiting embodiment, to a plurality of medical devices 220. Namely, in this embodiment, there is shown medical devices 220-1, 220-2, through 220-N. RFID access card 210 includes a hardware, firmware, and/or software ecosystem necessary to carry out its functions. For example, RFID access card 210 may include a transceiver 224, which may be an RFID transceiver, which provides near-field communication with RFID readers. A controller 240 may include an application-specific integrated circuit (ASIC), or a low-power microcontroller. Controller 240 may be activated when in near communication with an RFID reader, which powers up the circuit, and causes the circuit to perform certain logic functions.

In any embodiment, the device ecosystem 200 can authenticate a user holding the RFID access card 210 who can then access and perform operations on any one or more medical devices 220-1, 220-2, through 220-N. In any embodiment, the device ecosystem 200 can avoid the need for relying a traditional username and password pair. In any embodiment, the device ecosystem 200 can avoid the need for biometric data such as a fingerprint or iris scanner. In any embodiment, the device ecosystem 200 can avoid the need for centralized management of user credentials. In any embodiment, the device ecosystem 200 can avoid the need for a connection to a central credential server for the purpose of authentication. In any embodiment, the device ecosystem 200 can avoid the need for network connectivity for devices. In any embodiment, the device ecosystem 200 can avoid the need for an always-on network connection for medical devices. In any embodiment, the device ecosystem 200 can provide authentication access for settings where medical therapy is not administered in a well-funded, first-world urban hospital environment. In any embodiment, the device ecosystem 200 can be used in medical clinics that serve lower-income, rural, remote places such as clinics in less-developed countries, at military posts, or in other contexts. In any embodiment, the device ecosystem 200 can manage non-networked devices.

In any embodiment, the device ecosystem 200 can provide user authentication in a remote area without reliable, always-on internet connectivity. For example, one or more machines such as medical device can be deployed to provide a particular therapy. The clinic operating these machines can employ some tens of employees, and can service tens or hundreds of patients. The device ecosystem 200 can update credentials, intake new patients, remove patients as they are moved out of the system. The device ecosystem 200 can also add and remove employees, operators, technicians, caregivers, and clinicians from the system, all with different levels of access, different data, and different controls. The device ecosystem 200 can avoid the need to manual each machine or device every time a change to access controls is required. The device ecosystem 200 can avoid the need for each device storing and updating all user credentials. If the users stay the same or changes in data or roles associated with the users, then manual updates can be provided. In that case, mutual authentication with RFID cards using the device ecosystem 200 can be implemented. As described, ecosystem 100 may optionally be used to initially configure medical devices 120 with the appropriate secrets, such as a master secret or a local secret, before they are deployed in the environment where they are not going to be connected to a network full time. Alternatively, the secrets could be manually installed on the devices by an administrator. This manual operation may be far less cumbersome than manually maintaining and continuously updating credentials on the devices.

In any embodiment, an RFID card can be used as one non-limiting embodiment. However, other authentication tokens could be used, including hardware devices, such as a USB thumb drive, some other storage device, or any device that can carry the appropriate data, and that provides an appropriate communication interface. The communication interface could include, by way of illustrative and nonlimiting example, RFID, USB, serial, parallel, Wi-Fi, Bluetooth, infrared, or others. The reader device may be a medical device, or could be any suitable reader device that includes a communication interface that is able to read the hardware token and perform the appropriate authentication operations. In any embodiment, when the examples speak of an RFID card or a medical device, these specific examples could be replaced by any other suitable or equivalent device in that example.

In an illustrative example, the RFID card has an associated unique or pseudo-unique identifier. The unique or pseudo-unique identifier may be unique to each RFID card. The RFID card allows access to an onboard data structure to an RFID reader only if the RFID reader provides the correct password. Each RFID card may also have an associated unique identification number, which may be, for example, a globally unique identifier (GUID). In any embodiment, a GUID will be used as an example, but any other unique or pseudo-unique ID could be used as a replacement. The password of each RFID card can be determined using an algorithm that uses the GUID of the RFID card and a "secret," as well as potentially other data. The secret may be a shared secret that is known to all medical devices within a class for which the RFID reader is valid. For example, the shared secret can be provisioned at deployment time on a plurality of medical devices belonging to the same clinic. Thus, each of those devices may be able to reproduce the algorithm to generate the correct password for an RFID card with a GUID.

In various examples, the secret may be a combination of a master secret and a location-specific local secret, or the secret could be just a master secret. For example, the master secret is common to all medical devices in the class, such as all devices owned by a particular clinic. The master secret is installed on each device, regardless of where the medical device is installed or used. Thus, the master secret could apply to devices used in a very localized region, or the master secret could be applied to devices deployed across the world that are owned by the same clinic or enterprise, thus allowing a user with the correct RFID card to access and use any of those devices, regardless of where they are located.

The location-specific local secret may be specific to a location, like a particular clinic or other locality. The location-specific local secret varies from place to place, such as from clinic A to clinic B. Thus, the master secret may allow access to all devices of a particular class, such as all devices of a particular model, while the local secret may apply only to devices in that locality, or in that group.

The algorithm used may be, for example, a standard pseudorandom cryptographic algorithm, such as HMAC-SHA1, HMAC-SHA2, HMAC-SHA3, PBKDF2, or any other suitable algorithm. In an illustrative example, the RFID card contains a file structure, and one of the fields in the file structure is an authentication key. The authentication key may be created by the same algorithm used to create the password, or the authentication key could alternatively be created by a different algorithm. The algorithm uses the GUID of the RFID card and a "secret 2," as well as optionally other information. The "secret 2" may be unique to the location where the medical device is installed, or unique to a particular subset or subgroup of medical devices.

The secret 2 may be a combination of a master secret 2 and a location-specific local secret 2, or be just a location-specific local secret 2. In some embodiments, the location-specific local secret 2 is required to enable the authentication.

In an example, the master secret 2 is common to all the medical devices of a class, irrespective of the place of installation of the medical devices. Note that in some embodiments, the master secret and master secret 2 may be the same.

The location-specific local secret 2 is specific to a location like a clinic, or to a particular subclass of machines. Thus, the location-specific local secret varies from place to place, such as between clinic A and clinic B.

The location-specific local secret 2 may be based on a random number generated by a service technician during installation, and used across all medical device installations of the area. For example, all medical device installations of a particular clinic are provisioned with the same random or pseudorandom number generated by the service technician who is performing the deployment and installation. All of these devices belonging to, for example, a particular clinic receive the same location-specific local secret 2.

The location-specific local secret 2 may be based on some unique identification of the area where the medical device is installed. For example, the location-specific secret 2 may be based on the clinic name or clinic ID, which may be the same for all medical device installations in the clinic. This can help with identification, but is not mandatory.

With this ecosystem configured, mutual authentication may occur between the RFID card and the medical device. For example, the medical device may need to provide a password to the RFID card. To do this, the RFID card provides access to its contents only if the password is correct. Thus, authentication of the medical device by the RFID card is completed using the password of the RFID card.

For authentication of the RFID card by the medical device, the medical device reads the authentication key stored in the RFID card when allowed to do so (e.g., after providing the password to the RFID card). The medical device may also compute the authentication key by using the GUID of the RFID card and the secret 2, at a minimum. The secret is unique to the area where the medical device is installed, such as in the clinic. The secret contains location-specific local secret 2. The location-specific local secret 2 is set in each medical device in the group during installation.

The medical device compares the authentication key received from the RFID card with authentication key that the medical device computes. If both are the same, the authentication key of the RFID card is completed by the medical device.

After successful mutual identification, the medical device allows access to the access-controlled modes of the medical device. This system does not require the medical device to store any authentication information for any of the RFID cards. As long as each device is configured with the appropriate secrets, each can compute the correct authentication tokens, and exchange them as described above.

In any embodiment, user details, access level, and validity of the card can be written to the card. For example, the card could be programmed with an expiry in case the card is lost, and this information can be read during mutual authentication. This can achieve user identification, device and access control, and validity of the cards and user access. Furthermore, in some cases, patients or individual patient cards could be provisioned with patient-specific information. These could be provisioned to the patients themselves, or to a care provider. If the patient information is stored on the RFID card, the card may be encrypted using, for example, any of the secrets illustrated herein. The data can only be decrypted when the RFID card mutually authenticates with a reader device. The reader device can then decrypt the patient information, and load the information into the machine for operation. In this way, even if a user has not been treated on a particular machine before, the RFID card may carry all of the appropriate prescription and patient history information to program a new machine to perform the appropriate treatment.

In any embodiment, a GUID 244 can be installed or stored on the RFID access card 210. The GUID 244 can be used for any encryption, decryption, or identification functions disclosed herein. GUID 244 may be provisioned to RFID access card 210 by a credential server or other terminal when RFID access card 210 is first provisioned. GUID 244 can also be automatically generated using a random or pseudorandom number generator. In some cases, a pseudorandom number generator generates a number that is sufficiently large that to ensure cryptographically unlikelihood for the same number to be provisioned by two different devices. For example, a 1024-bit or 2048-bit cryptographic key can be generated randomly, to ensure unlikelihood that two devices will generate the same number independently. Thus, there is no need for a centralized control mechanism, or a central repository of GUIDs to ensure that they are globally unique or pseudo-unique. However, in some embodiments, such a central repository may optionally be used, and may ensure that the same GUID is not provisioned to two separate devices.

In any embodiment, RFID access card 210 can include a storage 228, which includes authentication data 232. Storage 228 may be, for example, a flash memory, or other nonvolatile memory technology. RFID access card 210 can be authenticated using authentication data 232 including a reader device as part of the mutual authentication mechanism provided herein.

Medical devices 220-1 may be similar devices, such as devices of the same or a similar model, or they could be different devices performing different medical functions. Additional details are illustrated in the context of medical device 220-1, and similar structures may be provided in other medical devices 220. In the case of medical device 220-1, a transceiver 212 provides an RFID reader that, for example, communicates with RFID access card 210 when RFID access card 210 is sufficiently close to transceiver 212. Transceiver 212 may provide a hardware and/or software stack to communicate with a similar hardware and/or software stack on transceiver 224 of RFID access card 210. Medical device 220-1 can also include a hardware platform 214, including a processor 216 and a memory 218. Stored within memory 218 may be volatile or nonvolatile data storage media, and on one of these storage media, there may be stored instructions to execute processor 216 to perform certain functions, such as to carry out the mutual authentication scheme. Thus, medical device 220-1 operates transceiver 212 to communicate with RFID access card 210, and the two devices perform a mutual authentication, as described herein.

Method of RFID Access Card Creation

Figure 3:
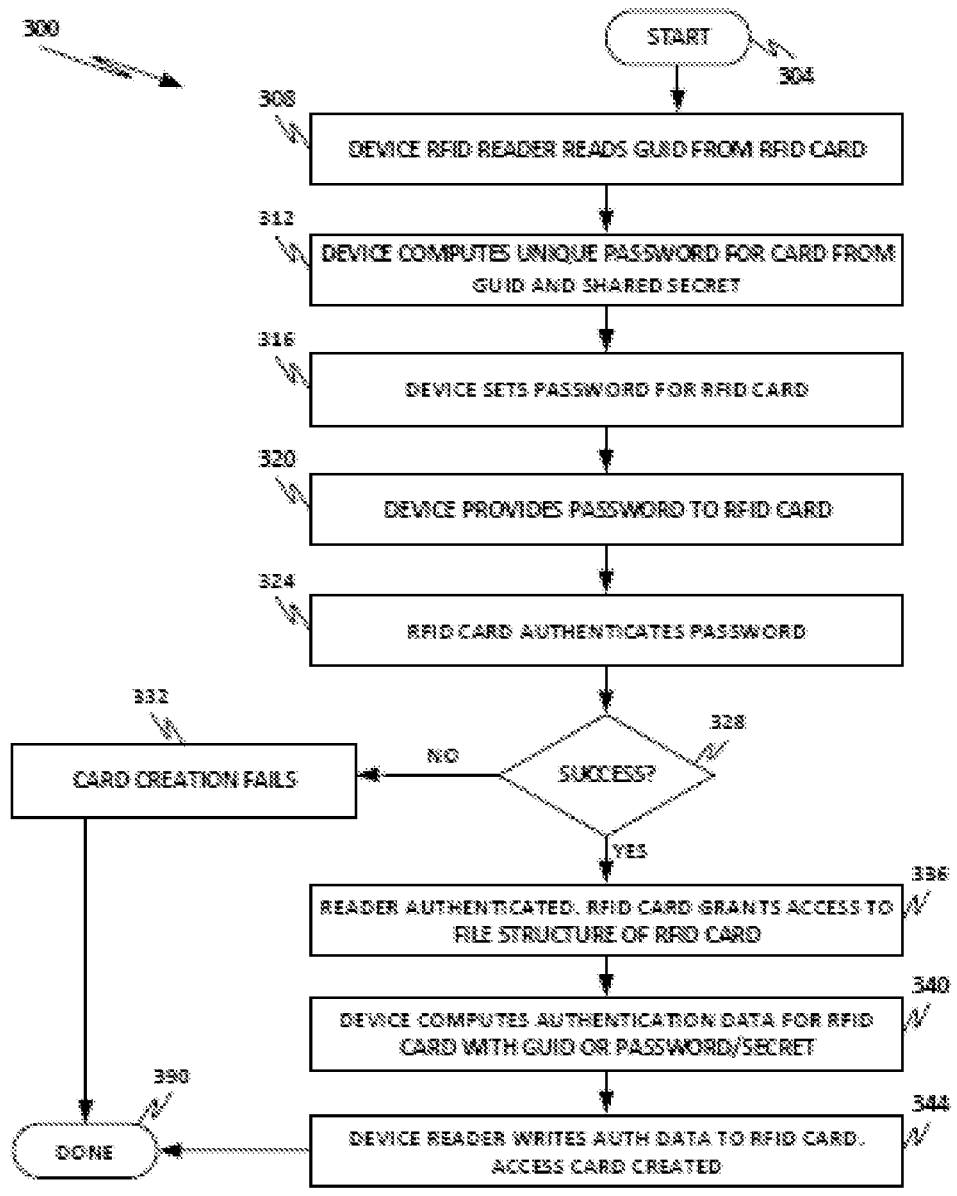
FIG. 3 is a flowchart of a method.

FIG. 3 is a flowchart of a method 300. Method 300 illustrates an example of initially creating an RFID access card for use in the system. This creation could be done, for example, at the factory, or at a headquarters, or if an RFID access card carries the appropriate secrets, creation or provisioning can be done by the first medical device that the RFID access card interfaces with.

The method starts in block 304.

In block 308, the device RFID reader reads the GUID from the RFID card.

In block 312, the medical device computes the unique password for the card using the unique ID and the secret as inputs to the algorithm.

In block 316, the medical device reader sets the password for the RFID card based on the computation of block 312.

In block 320, the medical device RFID reader provides the password to the RFID card.

In block 324, the RFID card authenticates the password, which may allow the RFID reader to access the file structure of the RFID card's memory.

In decision block 328, the RFID card checks whether the password authentication was successful.

If authentication was unsuccessful, then in block 332 the method fails, and in block 390, the method is done.

Returning to decision block 328, if the authentication was successful, then in block 336, the RFID card authenticates the reader and allows the reader to access the file structure of the RFID card.

In block 340, the medical device RFID reader computes the authentication data for the RFID card with the GUID of the card, and/or the password of the card and a secret as inputs.

In block 344, the RFID reader writes the unique authentication data to the RFID card, and the RFID card access card is now created. Note that in some cases, additional data may be written to the card upon creation, such as patient data or other data that is to be carried along with the card.

In block 390, the method is done.

Method of Mutual Authentication

Figure 4A:
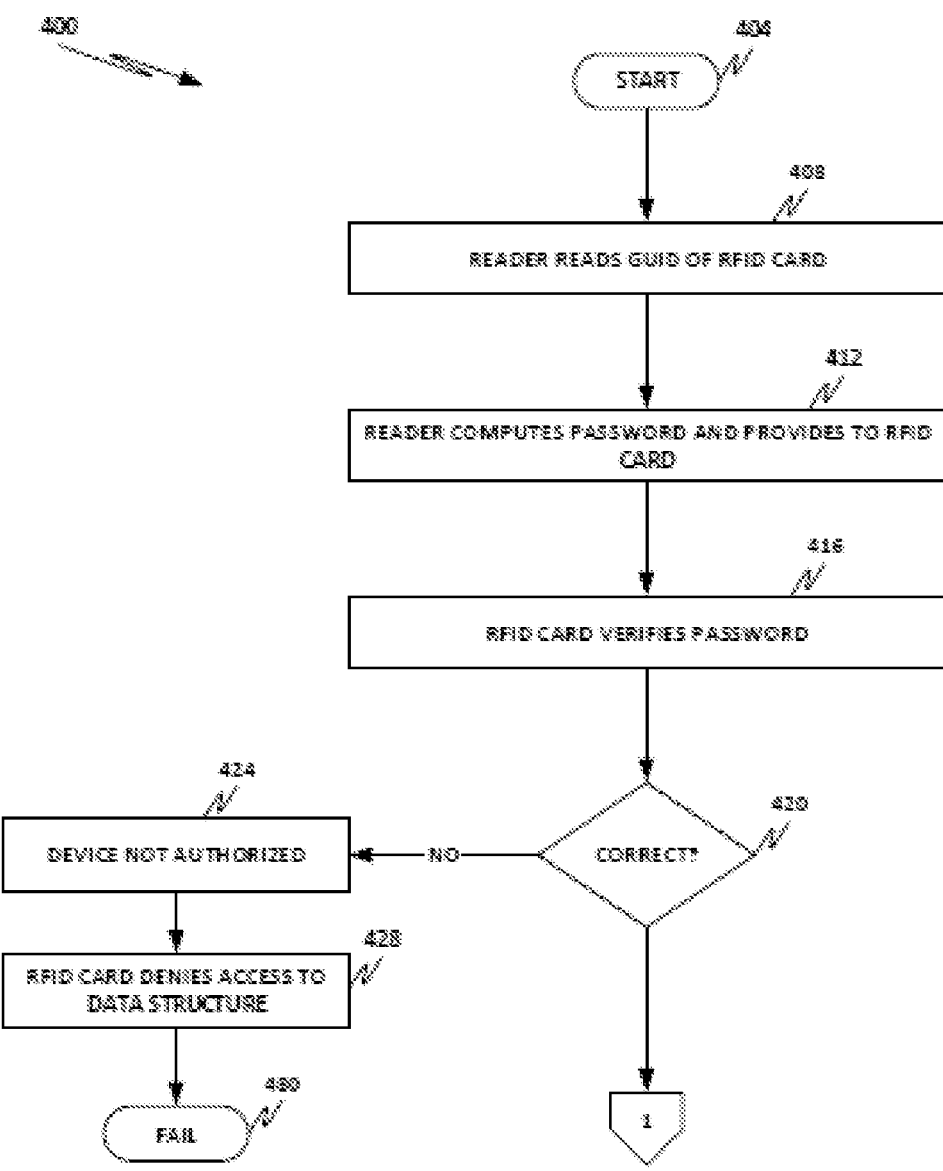
FIG. 4a and FIG. 4b are flowcharts of an additional method.
Figure 4B:
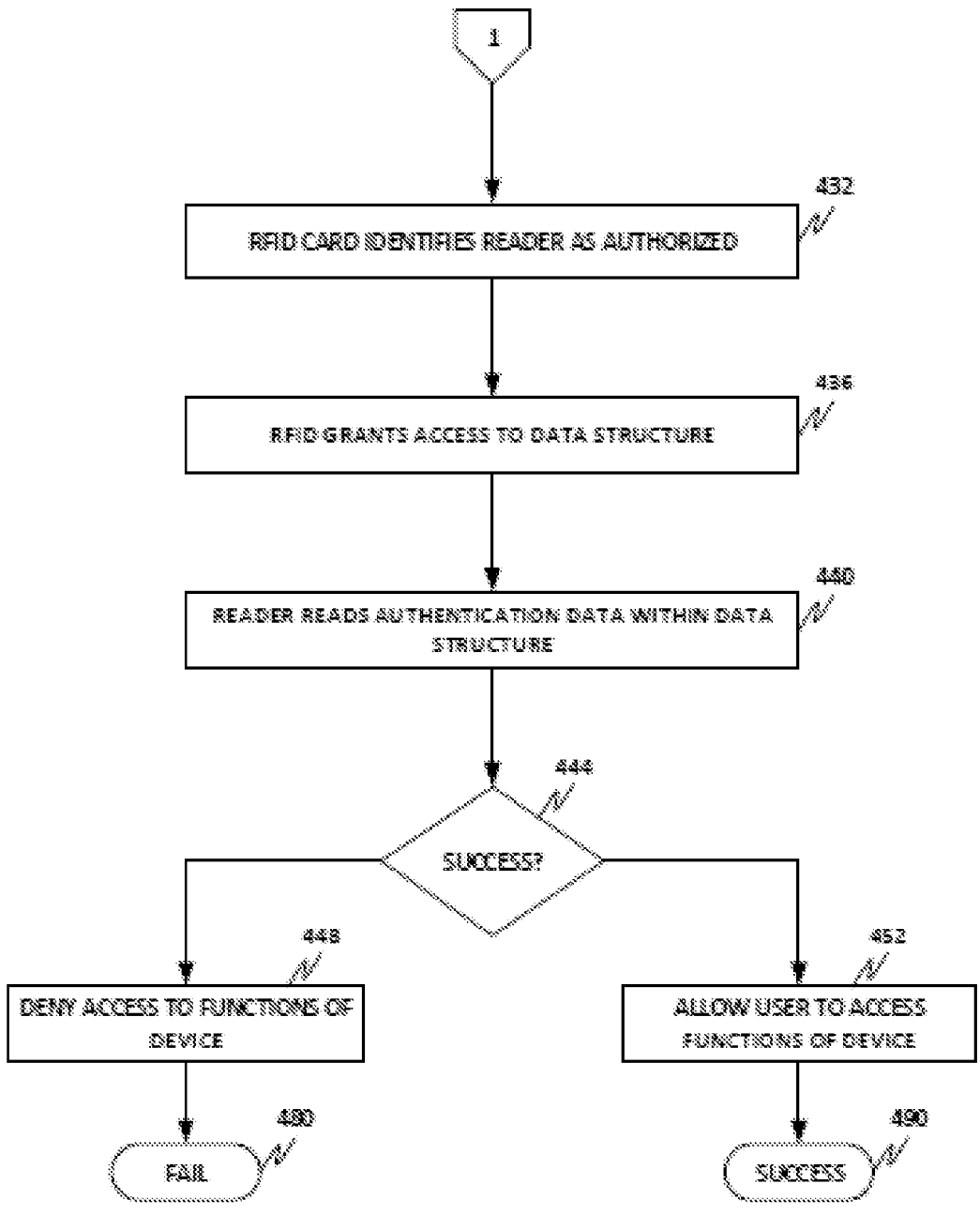

FIG. 4a and FIG. 4b are flowcharts of a method 400. Method 400 provides the mutual authentication.

The method starts in block 404.

In block 408, the medical device RFID reader reads the unique ID from the access card. Note that the GUID is openly readable before authentication.

In block 412, the medical device RFID reader computes the password from the GUID and from a secret, and then provides the password to the RFID access card.

In block 416, the RFID card verifies the password.

In decision block 420, the RFID card determines whether the password was correct.

If the password was not correct, then in block 424, the medical device RFID reader is identified is not authenticated by the access card. Thus, the device is not authorized.

In block 428, the medical device RFID reader is not allowed to access data of the access card. Thus, the mutual authentication process fails, and the user is not allowed to access functionality of the device. Note that because the authentication data for the card are stored in the card's data storage, the RFID reader has not had an opportunity to access the authentication data. In any embodiment, if either side of the mutual authentication fails, then there is no authentication, and neither device provides access to the other.

Returning to decision block 420, if the password is correct, then following off-page connector 1 to block 432, the RFID card identifies the medical device RFID reader as authentic. Thus, the RFID reader of the medical device is identified as authorized.

In block 436, the RFID card grants access to its data structure, so that the RFID reader can now access the data in the access card, and read the authentication data.

In block 440, the RFID reader device reads the authentication data from within the data structure contained in the access card.

In decision block 444, the reader device determines whether the authentication data successfully authenticated. This could include a cryptographic verification of the authentication data, such as by hashing a secret stored on the RFID card data structure.

If the RFID card was successfully validated, then in block 452, the mutual authentication process completes successfully, and the user is allowed to access certain functionalities of the device. In that case, in block 490, the operation is a success, and the method is done.

Returning to decision block 444, if the authentication of the RFID card does not succeed, then in block 448, the mutual authentication process has failed, and the user is not allowed to access functionalities of the device. Thus, in block 480, the authentication fails, and the method is done.

One skilled in the art will understand that various combinations and/or modifications and variations can be made in the described systems and methods depending upon the specific needs for operation. Various aspects provided herein may be combined in different combinations than the combinations specifically presented in the description and accompanying drawings. Moreover, features illustrated or described as being part of an aspect of the disclosure may be used in the aspect of the disclosure, either alone or in combination, or follow a preferred arrangement of one or more of the described elements. Depending on the example, certain acts or events of any of the processes or methods described herein may be performed in a different sequence, may be added, merged, or left out altogether (e.g., certain described acts or events may not be necessary to carry out the techniques). In addition, while certain aspects of this disclosure are described as performed by a single module or unit for purposes of clarity, the techniques of this disclosure may be performed by a combination of units or modules associated with, for example, a device.

What is claimed is:

1. A method for performing mutual authentication between a hardware access token and a reader device, comprising:

computing, by the reader device, a computed password from:

a unique or pseudo-unique identifier stored on the hardware access token and a group secret stored on the reader device;

wherein the unique or pseudo-unique identifier is read from the hardware access token when the hardware access token is in operational contact with the reader device;

granting, by the hardware access token, the reader device access to an onboard data structure of the hardware access token if the computed password, computed by the reader device, matches a password saved on the hardware access token, wherein the onboard data structure stores hardware access token authentication data;

authenticating, by the reader device, in response to accessing the hardware access token authentication data, a user of the hardware access token if the hardware access token authentication data read from the hardware access token matches reader device authentication data computed by the reader device from the unique or pseudo-unique identifier and a sub-group secret associated with sub-group-related access controls; and causing at least one therapeutic device, by the reader device, in response to the hardware access token authentication data matching the reader device authentication data saved on the reader device, to enable the user associated with the hardware access token to control the at least one therapeutic device in at least one access controlled mode based at least in part on the sub-group-related access controls associated with a sub-group corresponding to the sub-group secret.

2. The method of claim 1, wherein the reader device is a non-networked device.

3. The method of claim 1, wherein the reader device is a biomedical device.

4. The method of claim 1, wherein the hardware access token is a radio frequency identification (RFID) card.

5. The method of claim 1, wherein the hardware access token is a universal serial bus (USB) drive.

6. The method of claim 1, further comprising determining that a second hardware access token has not been provisioned for use with the reader device, generating an onboard data structure, including authentication data, for the second hardware access token, and storing the generated onboard data structure on the second hardware access token.

7. The method of claim 1, wherein the group secret is a shared key between a group comprising a plurality of similar reader devices.

8. The method of claim 7, wherein the group comprises a subset of similar reader devices being less than all reader devices of a particular model supplied by a common manufacturer.

9. The method of claim 7, wherein the group comprises a set of devices operated by a common enterprise, and wherein the group secret is unique to the enterprise.

10. The method of claim 9, wherein the enterprise is a medical clinic or hospital.

11. The method of claim 1, further comprising provisioning a group secret to a device newly added to a group.

12. The method of claim 1, further comprising removing the group secret from a device to be removed from a group.

13. The method of claim 1, further comprising recognizing a master control token for a group, and entering an administrative mode.

14. The method of claim 1, wherein the hardware access token further comprising an onboard data structure including an expiry for the hardware access token.

15. A multimode device to provide a plurality of modes, including one or more access-controlled modes, comprising:

a hardware platform comprising a processor and a memory;

a token reader comprising an interface to communicate with one or more hardware access tokens; and instructions encoded within the memory to instruct the processor to:

detect, via the token reader, an insertion or proximity of a hardware access token;

obtain, via the token reader, an identification key from the hardware access token;

compute, based at least in part on the identification key and a group key stored on the multimode device, a password for the hardware access token;

use the password to access an authentication data structure stored on the hardware access token, wherein the hardware access token is configured to authenticate the reader device based on the password to enable the reader device to read the authentication data structure and access authentication data;

authenticate a user of the hardware access token using the identification key and the authentication data read from the hardware access token based at least in part on reader device authentication data computed by the token reader from the identification key and a sub-group key associated with sub-group-related access controls; and responsive to authenticating the user, unlock an access-controlled mode of the multimode device based at least in part on the sub-group-related access controls associated with a sub-group corresponding to the sub-group key;

wherein the access-controlled mode of the multimode device is either a therapeutic mode or a therapy settings mode.

16. The multimode device of claim 15, wherein the device is a non-networked device.

17. The multimode device of claim 15, wherein the device is a biomedical device.

18. The multimode device of claim 15, wherein the one or more hardware access tokens further comprise radio frequency identification (RFID) cards.

19. The multimode device of claim 15, wherein the one or more hardware access tokens further comprise universal serial bus (USB) drives.

20. The multimode device of claim 15, wherein the group key is a shared key between a group comprising a plurality of similar devices.

21. The multimode device of claim 20, wherein the group comprises a subset of similar devices being less than all devices of a particular model supplied by a common manufacturer.

22. The multimode device of claim 20, wherein the group comprises a set of devices operated by a common enterprise, and wherein the group key is unique to the enterprise.

23. The multimode device of claim 22, wherein the enterprise is a medical clinic or hospital.

24. The multimode device of claim 20, further comprising provisioning the group secret to a device newly added to the group.

* * * * *